US012682094B2

(12) United States Patent
Vollmar et al.

(10) Patent No.: US 12,682,094 B2
(45) Date of Patent: Jul. 14, 2026

(54) DATA COMPLIANCE IN AN EDGE COMPUTING ENVIRONMENT

(71) Applicant: International Business Machines Corporation, Armonk, NY (US)

(72) Inventors: Christopher J. Vollmar, Mississauga (CA); Joseph W. Dain, Tucson, AZ (US); Frank N. Lee, Sunset Hills, MO (US); Sandeep Ramesh Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 18/208,096

(22) Filed: Jun. 9, 2023

(65) Prior Publication Data

US 2024/0411908 A1    Dec. 12, 2024

(51) Int. Cl.
*G06F 21/62*        (2013.01)
*G06F 16/11*        (2019.01)
*G06F 16/182*       (2019.01)

(52) U.S. Cl.
CPC ........ *G06F 21/6218* (2013.01); *G06F 16/122* (2019.01); *G06F 16/184* (2019.01)

(58) Field of Classification Search
None
See application file for complete search history.

(56) References Cited

U.S. PATENT DOCUMENTS

| | | | |
|---|---|---|---|
| 7,660,800 B2 | 2/2010 | Prahlad et al. | |
| 8,396,838 B2 | 3/2013 | Brockway et al. | |

| | | | |
|---|---|---|---|
| 9,098,542 B2 | 8/2015 | Prahlad et al. | |
| 9,734,169 B2 | 8/2017 | Redlich et al. | |
| 10,454,944 B2 | 10/2019 | Minkovich et al. | |
| 11,227,059 B2 | 1/2022 | Blandin et al. | |
| 11,556,938 B2 | 1/2023 | Nair et al. | |
| 12,081,557 B2 | 9/2024 | Barton et al. | |
| 12,111,846 B2 | 10/2024 | Ceesay et al. | |
| 2010/0274750 A1 | 10/2010 | Oltean et al. | |

(Continued)

OTHER PUBLICATIONS

Allegue et al., "Toward GDPR Compliance in IOT Systems," Service-Oriented Computing—ICSOC 2019 Workshops, 2019, 12 pages, retrieved from https://www.researchgate.net/publication/340882620_Toward_GDPR_Compliance_in_IoT_Systems.

(Continued)

*Primary Examiner* — Brandon Hoffman

(74) *Attorney, Agent, or Firm* — Edward J. Wixted, III

(57) ABSTRACT

A computer-implemented method, according to one approach, includes using a determined classification of a predetermined file to determine a data compliance ruleset that applies to data of the predetermined file. In response to a determination that the data of the predetermined file is scheduled to be moved and/or replicated from a source node to a target node of an edge computing environment, the determined data compliance ruleset is applied to the data of the predetermined file. The method further includes preventing the scheduled movement and/or replication of the data of the predetermined file from occurring, in response to a determination that the scheduled movement and/or replication of the data of the predetermined file violates at least one rule of the determined data compliance ruleset.

20 Claims, 7 Drawing Sheets

(56) References Cited

U.S. PATENT DOCUMENTS

| 2021/0248252 A1 | 8/2021 | Darji |
| 2022/0019671 A1 | 1/2022 | Boone et al. |
| 2022/0172222 A1 * | 6/2022 | Chin ........................ H04L 67/53 |
| 2023/0135659 A1 * | 5/2023 | Wu .......................... G06N 3/044 |
| | | 706/21 |
| 2024/0012921 A1 | 1/2024 | Yannuzzi et al. |
| 2024/0039959 A1 | 2/2024 | Yannuzzi et al. |
| 2025/0265335 A1 | 8/2025 | Dain et al. |

OTHER PUBLICATIONS

Dain et al., "Cognitive Data Repatriation and Data Removal", U.S. Appl. No. 19/201,124, filed May 7, 2025, 56 Pages.

* cited by examiner

100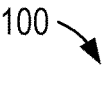

CLIENT COMPUTER  101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

DATA COMPLIANCE CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

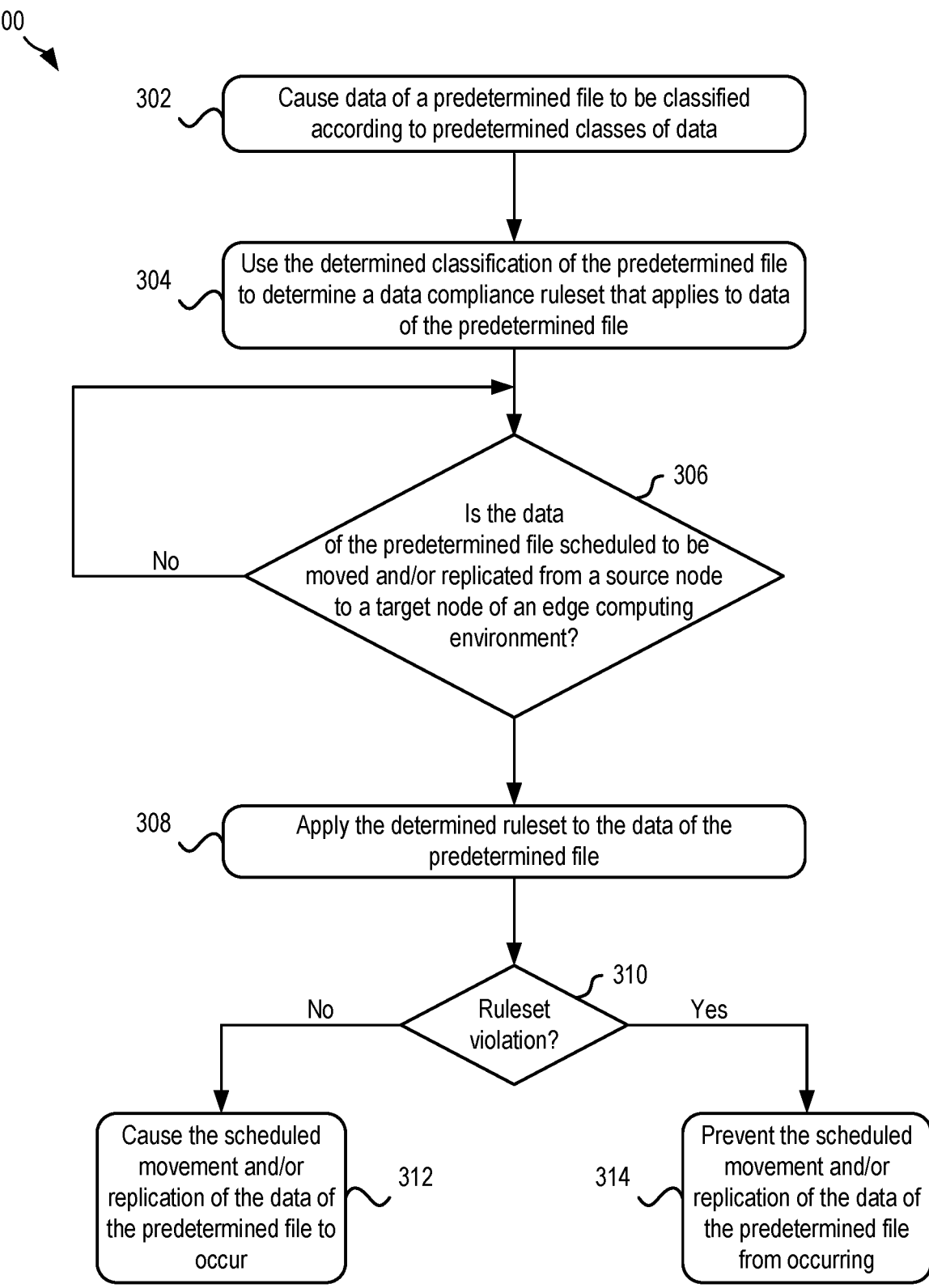

300

302 — Cause data of a predetermined file to be classified according to predetermined classes of data 304 — Use the determined classification of the predetermined file to determine a data compliance ruleset that applies to data of the predetermined file 306 — Is the data of the predetermined file scheduled to be moved and/or replicated from a source node to a target node of an edge computing environment?

No

308 — Apply the determined ruleset to the data of the predetermined file

310 — Ruleset violation?

No

Yes

312 — Cause the scheduled movement and/or replication of the data of the predetermined file to occur 314 — Prevent the scheduled movement and/or replication of the data of the predetermined file from occurring

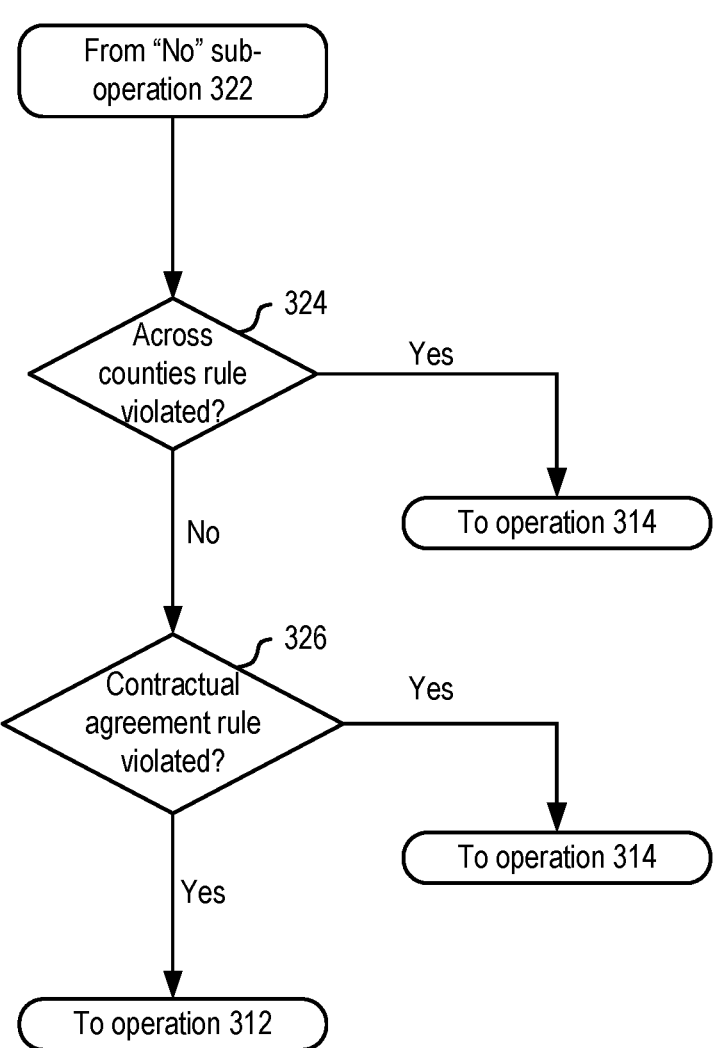
FIG. 3B
(continued)

400

| Content classification module |
| 402 |

| Compliance mapping module |
| 404 |

| Sovereignty mapping module |
| 406 |

| Replication policy engine |
| 408 |

| Replication compliance module |
| 410 |

DATA COMPLIANCE IN AN EDGE COMPUTING ENVIRONMENT

BACKGROUND

The present invention relates to edge computing environments, and more specifically, this invention relates to data movement and/or replication compliance in an edge computing environment.

Edge computing is a relatively rapidly emerging computing model. It is estimated that a majority portion of enterprises run varying levels of data processing at an Internet of Things (IoT) Edge. An edge computing model places enterprise applications relatively closer to the location at which the data is created, and the location at which actions are to be performed using such data. Edge computing models typically require a decentralized approach to application design, and bring with them new challenges of workload and data management across thousands of endpoints.

Data management is often considered the number one challenge associated with edge computing. This data management issue is sometimes referred to as a "data gravity" problem, and it pertains to ensuring data processing at the edge is in compliance with various regulatory standards. For example, the Federal Communications Commission (FCC) dictates that fifth-generation (5G) radio frequency (RF) data cannot be moved across state boundaries. In another example, the Payment Card Industry Data Security Standard (PCI-DSS) dictates that data containing sensitive cardholder information must be tracked and managed in predetermined manners. For example, cardholder information is not allowed to be stored in a public cloud. Similar constraints exist for other governing and/or controlling standards and other information handling regulations.

Currently there are no conventional techniques for ensuring that data that is scheduled to be replicated and/or migrated from a first node to a second node in an edge computing environment is done so according to the regulations mentioned above. In other words, it is completely up to each customer to ensure that data is managed at an edge in a manner that does not violate regulations, and there are no known standardized techniques for ensuring this. Accordingly, there is a longstanding technique for actively managing this "data gravity" problem that exists in conventional edge computing environments.

SUMMARY

A computer-implemented method, according to one approach, includes using a determined classification of a predetermined file to determine a data compliance ruleset that applies to data of the predetermined file. In response to a determination that the data of the predetermined file is scheduled to be moved and/or replicated from a source node to a target node of an edge computing environment, the determined data compliance ruleset is applied to the data of the predetermined file. The method further includes preventing the scheduled movement and/or replication of the data of the predetermined file from occurring, in response to a determination that the scheduled movement and/or replication of the data of the predetermined file violates at least one rule of the determined data compliance ruleset.

A computer program product, according to another approach, includes a computer program product comprising a computer readable storage medium having program instructions embodied therewith. The program instructions are readable and/or executable by a computer to cause the computer to perform any aspects of the foregoing methodology.

A system, according to another approach, includes a processor, and logic integrated with the processor, executable by the processor, or integrated with and executable by the processor. The logic is configured to perform any aspects of the foregoing methodology.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one aspect of the present invention.

FIG. 3A is a flowchart of a method, in accordance with one aspect of the present invention.

DETAILED DESCRIPTION

Figure 2:
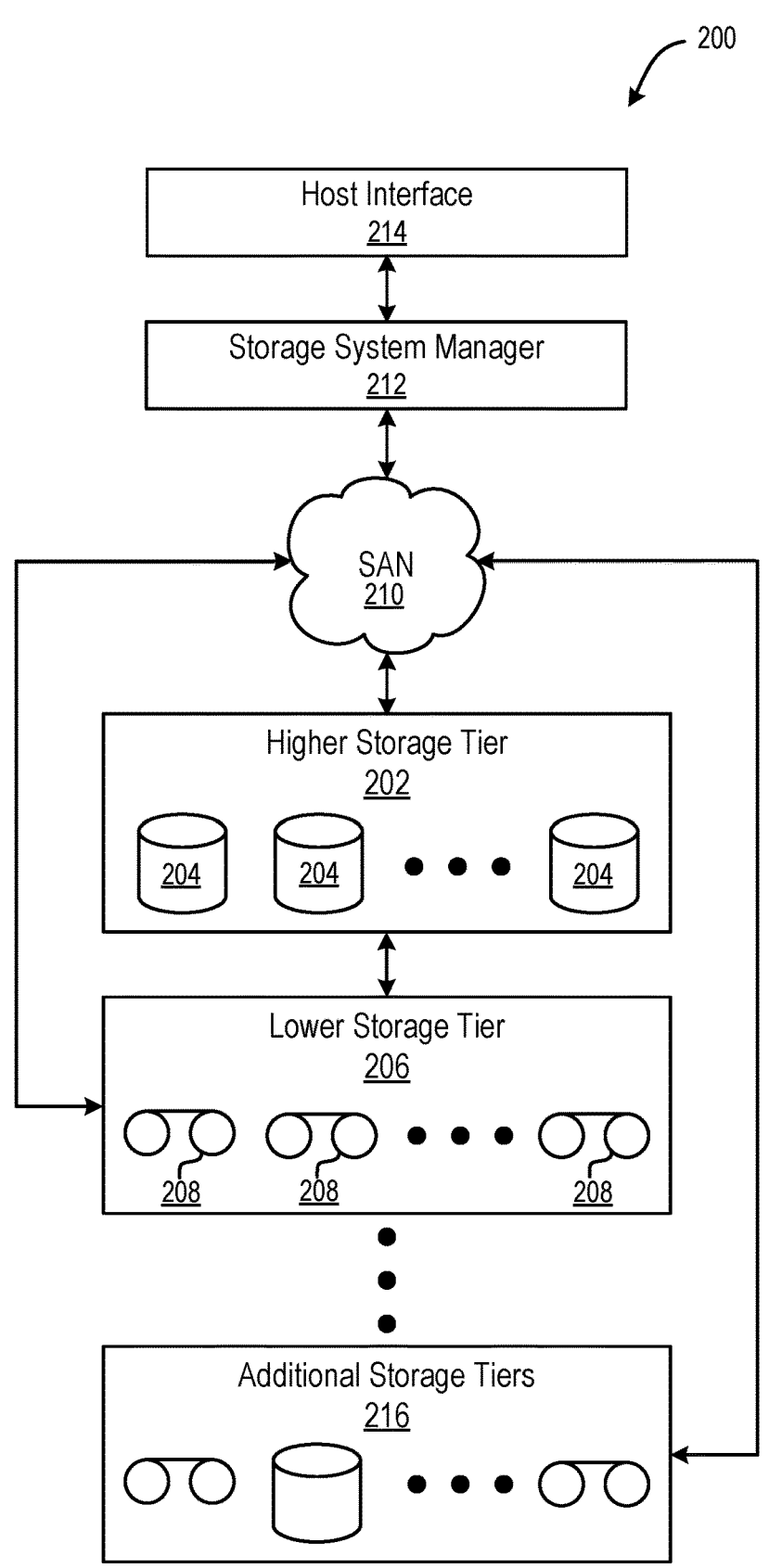
FIG. 2 is a diagram of a tiered data storage system, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for data movement and/or replication compliance in an edge computing environment.

In one general approach, a computer-implemented method includes using a determined classification of a predetermined file to determine a data compliance ruleset that applies to data of the predetermined file. Using the determined classification of the predetermined file to determine the predetermined data compliance ruleset that applies to the data of the predetermined file ensures that an applicable and relevant ruleset is prepared and ready to be applied in the event that the data is scheduled to be moved and/or replicated from a first node to a second node in the edge computing environment. More specifically, as a result of determining an applicable ruleset that applies to data of the predetermined file, the move and/or replication operation is not thereafter delayed as the ruleset may be applied upon a determination being made that the move and/or replication operation is scheduled.

In response to a determination that the data of the predetermined file is scheduled to be moved and/or replicated from a source node to a target node of an edge computing environment, the determined data compliance ruleset is applied to the data of the predetermined file. Application of the determined data compliance ruleset to the data of the predetermined file in response to a determination that the data of the predetermined file is scheduled to be moved and/or replicated from a source node to a target node of an edge computing environment enables a determination to be made whether such movement should in fact not be performed. It should be noted that by determining whether such movement should in fact not be performed, before the movement is performed, ensures that the data compliance ruleset is never violated, and movement events that would otherwise result in such violations are preferably cancelled.

The method further includes preventing the scheduled movement and/or replication of the data of the predetermined file from occurring, in response to a determination that the scheduled movement and/or replication of the data of the predetermined file violates at least one rule of the determined data compliance ruleset. Preventing the scheduled movement and/or replication of the data from occurring in response to a determination that such a scheduled movement and/or replication would otherwise violate one or more rules of the determined data compliance rule enables several performance benefits in the edge computing environment. For example, it may be noted that conventional techniques described herein would otherwise allow similar scheduled movement and/or replications to occur despite the scheduled movement and/or replications violating one or more laws and/or regulations. Accordingly, these conventional techniques waste processing resources in performing these movement and/or replication operations because the data moved and/or replicated to the target device is removed from the target device upon discovering the error. In sharp contrast, using the techniques of the novel approaches described herein, movement and/or replication operations that violate rules of a determined data compliance ruleset are prevented from being performed. In doing so, processing potential that would otherwise be unnecessarily expended is preserved.

The determined data compliance ruleset includes a plurality of rules, and in response to a determination that the scheduled movement and/or replication of the data of the predetermined file does not violate any of the rules of the determined data compliance ruleset, the scheduled movement and/or replication of the data of the predetermined file is caused to occur. By causing the scheduled movement and/or replication of the data of the predetermined file to occur in response to a determination that such a scheduled movement and/or replication does not violate one or more rules of the determined data compliance rule, operations of the edge computing environment are ensured to comply with governing and/or contractual rules. Relatively often, data compliance rules are based on measures that protect data, e.g., maintaining data on private versus public storage. Accordingly, the techniques described herein protect user data from being subjected to damaging and/or malicious actors, e.g., such as unauthorized devices attempting to access the data, devices attempting to intercept the data, etc. This further improves performance of the edge computing environment by avoiding events that would otherwise consume processing potential in recovering from.

The method further includes causing the data of the predetermined file to be classified according to predetermined classes of data, where natural language processing operations are performed for classifying the data of the predetermined file. Classifying the data ensures that processing that is thereafter performed as a result of applying rules of a determined ruleset to the data, is not inaccurate. In other words, classification of the data enables a relatively accurate applicable ruleset to be determined for the data of the predetermined file. Without determining such a classification, at least some of the rules that would otherwise be applied to the data of the predetermined file would be non-applicable. Accordingly, the classification of the data of the predetermined file relatively reduces the amount of processing that is performed for analyzing whether the data is able to be migrated and/or replicated.

The classes of data are selected from the group consisting of: Federal Communications Commission (FCC) data, financial data, health data, data subject to predetermined consumer privacy acts, and data subject to predetermined data protection regulations. This group of classes of data is particularly relevant in the field of data movement in that it includes types of data that are typically subject to different rules and regulations in different jurisdictions throughout the world. Accordingly, the techniques described herein ensure that movement of these relevant classes of data in a way that would violate one or more rules of the determined data compliance ruleset are considered and avoided.

The target node is a core node of the edge computing environment. Movement of data to a core node is applicable in many business applications. Accordingly, the techniques described herein ensure that business practices with respect to the movement of data adhere to the determined data compliance ruleset.

A first rule of the determined data compliance ruleset does not allow movement and/or replication of the data across countries. The scheduled movement and/or replication of the data of the predetermined file is determined to violate the first rule in response to a determination that the source node is located in a first country and the target node is located in a second country that is different than the first country. Identifying cases in which the scheduled movement and/or replication of the data would otherwise violate one or more rules of the determined data compliance rule enables several performance benefits in the edge computing environment. For example, it may be noted that conventional techniques described herein would otherwise allow similar scheduled movement and/or replications to occur despite the scheduled movement and/or replications violating one or more laws and/or regulations. Accordingly, these conventional techniques waste processing resources in performing these movement and/or replication operations because the data moved and/or replicated to the target device is removed from the target device upon discovering the error. In sharp contrast, using the techniques of the novel approaches described herein, movement and/or replication operations that violate rules of a determined data compliance ruleset are prevented from being performed. In doing so, processing potential that would otherwise be unnecessarily expended is preserved.

A second rule of the determined data compliance ruleset does not allow movement and/or replication of the data across states. The scheduled movement and/or replication of the data of the predetermined file is determined to violate the second rule in response to a determination that the source node is located in a first state and the target node is located in a second state that is different than the first state. As indicated above, identifying cases in which the scheduled movement and/or replication of the data would violate one or more rules of the determined data compliance ruleset enables processing potential that would otherwise be unnecessarily expended to be preserved.

A third rule of the determined data compliance ruleset does not allow movement and/or replication of the data across county lines of a state. The scheduled movement and/or replication of the data of the predetermined file is determined to violate the third rule in response to a determination that the source node is located in a first county and the target node is located in a second county that is different than the first county. As indicated above, identifying cases in which the scheduled movement and/or replication of the data would violate one or more rules of the determined data compliance ruleset enables processing potential that would otherwise be unnecessarily expended to be preserved.

A fourth rule of the determined data compliance ruleset is based on a predetermined contractual agreement between at least two organizations associated with the data. The fourth rule does not allow movement and/or replication of the data from a private to a public domain. The scheduled movement and/or replication of the data of the predetermined file is determined to violate the fourth rule in response to a determination that the source node stores data on a private domain and the target node stores data on a public domain that is different than the private domain. As indicated above, identifying cases in which the scheduled movement and/or replication of the data would violate one or more rules of the determined data compliance ruleset enables processing potential that would otherwise be unnecessarily expended to be preserved. These techniques furthermore ensure that a predetermined contractual agreement between at least two organizations associated with the data is met and maintained. This mitigates an amount of computer processing that would otherwise be performed in recovering from a breach of the predetermined contractual agreement.

In another general approach, a computer program product includes a computer program product comprising a computer readable storage medium having program instructions embodied therewith. The program instructions are readable and/or executable by a computer to cause the computer to perform any aspects of the foregoing methodology.

In another general approach, a system includes a processor, and logic integrated with the processor, executable by the processor, or integrated with and executable by the processor. The logic is configured to perform any aspects of the foregoing methodology.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as data compliance code of block 150 for data movement and/or replication compliance in an edge computing environment. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

Now referring to FIG. 2, a storage system 200 is shown according to one approach. Note that some of the elements shown in FIG. 2 may be implemented as hardware and/or software, according to various approaches. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the approaches presented herein.

According to some approaches, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere above, edge computing is a relatively rapidly emerging computing model. It is estimated that a majority portion of enterprises run varying levels of data processing at an Internet of Things (IoT) edge. An edge computing model places enterprise applications relatively closer to the location at which the data is created, and the location at which actions are to be performed using such data. Edge computing models typically require a decentralized approach to application design, and bring with them new challenges of workload and data management across thousands of endpoints.

Data management is often considered the number one challenge associated with edge computing. This data management issue is sometimes referred to as a "data gravity" problem, and it pertains to ensuring data processing at the edge is in compliance with various regulatory standards. For example, the Federal Communications Commission (FCC) dictates that 5G radio frequency (RF) data cannot be moved across state boundaries. In another example, the Payment Card Industry Data Security Standard (PCI-DSS) dictates that data containing sensitive cardholder information must be tracked and managed in predetermined manners. For example, cardholder information is not allowed to be stored in a public cloud. Similar constraints exist for other governing and/or controlling standards and other information handling regulations.

Currently there are no conventional techniques for ensuring that data that is scheduled to be replicated and/or migrated from a first node to a second node in an edge computing environment is done so according to the regulations mentioned above. In other words, it is completely up to each customer to ensure that data is managed at a node in a manner that does not violate regulations, and there are no known standardized techniques for ensuring this. Accordingly, there is a longstanding technique for actively managing this "data gravity" problem that exists in conventional edge computing environments.

In sharp contrast to the deficiencies in the conventional approaches described above, the techniques described herein combine an event driven artificial intelligence (AI) metadata workflow that uses cognitive techniques such as natural language processing and/or named entity recognition, optical character recognition, speech to text, regular expression pattern matching, etc., to identify data that contains information subject to one or more compliance regulations. A data compliance ruleset that is determined to apply to the identified data is then applied to the data to ensure that the data is not migrated and/or replicated within an edge computing environment in such a way that violates one or more rules of the determined data compliance ruleset. These techniques may furthermore be combined with a location and/or sovereignty of each edge node and core instance in a topology which is cross referenced by data sovereignty rules of various data compliance regulations to automatically ensure that data is not replicated or moved from node to node or node to core in a manner that would violate one or more rules of a determined ruleset, without interaction from a user during the execution of replication policies and/or when presenting users with valid replication targets when executing different replication policies.

Now referring to FIG. 3A, a flowchart of a method 300 is shown according to one approach. The method 300 may be performed in accordance with the present invention in any of the environments depicted in FIGS. 1-5, among others, in various approaches. Of course, more or fewer operations than those specifically described in FIG. 3A may be included in method 300, as would be understood by one of skill in the art upon reading the present descriptions.

Each of the steps of the method 300 may be performed by any suitable component of the operating environment. For example, in various approaches, the method 300 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 may be performed in a type of edge computing environment that would become apparent to one of ordinary skill in the art after reading the descriptions herein. In some preferred approaches, the edge computing environment may include a plurality of edge devices, which depending on the approach may be, e.g., a computer, a server, a processing circuit, tiers of a tiered data storage system, etc. At least some of the edge devices may be located at different geographical locations, e.g., different cities, different counties, different countries, different states, different continents, etc., that may have different governing regulations with respect to the management of data. Furthermore, in some approaches, the edge computing environment includes a core, e.g., a core edge device. In some preferred approaches, each of the plurality of edge devices are computers and/or servers that are all configured to communicate and selectively relay data to a core that is at a different location than each of the edge devices. In one or more of such approaches, applications may be deployed on the edge devices where the edge devices are located at branches of a corporation while the core is located at headquarters of the corporation.

In some approaches, at least some of the edge devices have files stored on the edge devices. Data of the files may, in some approaches, be classified, e.g., such as in response to a determination that at least some of the data of a predetermined file stored on a first edge device is scheduled to be moved and/or replicated to a second edge device. Operation 302 includes causing data of the predetermined file to be classified according to one or more predetermined classes of data. In one approach, a first of the classes of data includes Federal Communications Commission (FCC) data. In another approach, the classes of data may include financial data, e.g., banking records, purchase history, loan documents, credit card numbers, etc. In yet some other approaches, the classes of data include health data, e.g., such as Health Insurance Portability and Accountability Act (HIPAA) data. In another approach, the classes of data may include data subject to predetermined consumer privacy acts, e.g., such as California Consumer Privacy Act Data. The classes of data may additionally and/or alternatively include data subject to predetermined data protection regulations, e.g., such as the General Data Protection Regulation.

It should be noted that user data that is used in the techniques described herein is preferably only used subsequent to gaining permission to do so from users that the data pertains to. More specifically, this permission is preferably obtained in such a way that the user has the opportunity to consider and review details of how their information will be used (to assist the user in making an informed decision), and the user is thereafter presented with an option to opt-in, e.g., an expressly performed opt-in selection. Thereafter, in some approaches, the user is preferably reminded of their opt-in, and ongoingly presented with features, e.g., output for display on a user device associated with the user, that relatively easily allow the user to retract their previous election to opt-in. Note that these features may be presented to the user in any one or more formats, e.g., audibly, visually, braille, in multiple languages, etc. For example, the user may be presented with an unambiguous opt-out selection feature which, if elected by the user, terminates collection and use of data associated with the user, erases previously used data associated with the user, and notifies the user of the course of action taken to respect the user's selection of the opt-out selection feature. In the event that the user does not want to have their data used in one or more of the operations described herein, this decision is respected, and the user is preferably not again presented with such an option unless the user thereafter requests to reconsider the opt-in feature, e.g., based on a change in their decision. It should also be noted that the techniques described herein do not profit form and exploit user data, but in sharp contrast, protect user data by ensuring that the data is not moved and/or replicated against one or more data compliance rulesets.

One or more techniques that would become apparent to one of ordinary skill in the art after reading the descriptions herein may be used for classification of the data of the predetermined file. For example, in some approaches, natural language processing operations may, in some approaches, be performed for classifying the data of the predetermined file. During such classifying, the processing operations may parse textual data of the predetermined file to determine whether at least a predetermined number and/or frequency of predetermined keywords of a given one of the predetermined classes are included in the predetermined file. The processing operations may additionally and/or alternatively include inspecting the data for predetermined terms that are consistent with one or more regulatory compliance mandates, e.g., predetermined keywords. Additional classifying techniques that may additionally and/or alternatively be performed include, e.g., other cognitive techniques such as named entity recognition, optical character recognition, speech to text, regular expression pattern matching, etc.

A primary benefit of classifying the data includes ensuring that processing that is thereafter performed as a result of applying rules of a determined ruleset to the data, is not inaccurate. In other words, classification of the data enables a relatively accurately applicable ruleset to be determined for the data of the predetermined file. Without determining such a classification, at least some of the rules that would otherwise be applied to the data of the predetermined file would be non-applicable. Accordingly, the classification of the data of the predetermined file relatively reduces the amount of processing that is performed for analyzing whether the data is able to be migrated and/or replicated. For example, operation 304 includes using a determined classification of a predetermined file to determine a predetermined data compliance ruleset that applies to data of the predetermined file. For context, the data compliance ruleset that applies to data of the predetermined file is preferably one that scrutinizes, e.g., applies rules that must be met, the data with respect to the determined classification of the data. For example, in response to a determination that the data is classified to be health data, a data compliance ruleset that includes a plurality of HIPAA rules may be determined to apply to the data of the predetermined file. In another example, in response to a determination that the data is classified to be data subject to a predetermined consumer privacy act, a data compliance ruleset that includes a plurality of consumer privacy act rules may be determined to apply to the data of the predetermined file.

Using the determined classification of the predetermined file to determine the predetermined data compliance ruleset that applies to the data of the predetermined file ensures that an applicable and relevant ruleset is prepared and ready to be applied in the event that the data is scheduled to be moved and/or replicated from a first node to a second node in the edge computing environment. More specifically, as a result of determining an applicable ruleset that applies to data of the predetermined file, the move and/or replication operation is not thereafter delayed as the ruleset may be applied upon a determination being made that the move and/or replication operation is scheduled.

It should be noted that, in some approaches, the data of the predetermined file may change over time, e.g., have one or more portions deleted, have additional data added to the predetermined file, etc. This may result in a relevant classification of the data changing and/or an additional classification applying to the data. Accordingly, in response to a determination that the data has been modified at least a predetermined amount, the predetermined file may be again classified and/or a determination may be made as to whether another and/or an additional ruleset applies to data of the predetermined file. In some approaches, only portions of the data determined to have been changed, e.g., the new data, the amended data, etc., may be considered during this process in order to preserve processing potential of a processing circuit that is performing method 300.

Decision 306 includes determining whether data of the predetermined file is scheduled to be moved and/or replicated from a source node to a target node of the edge computing environment. In some preferred approaches, the source node is a node in which the data is currently stored, and the target node is a core node of the edge computing environment, on which the data is to be stored as a result of performance of a scheduled migration and/or replication operation. In some approaches, an input/output (I/O) queue of a processing circuit of the edge computing environment is monitored to determine whether the data of the predetermined file is scheduled to be moved and/or replicated from a source node to a target node of the edge computing environment. In response to a determination that the data of the predetermined file is not scheduled to be moved and/or replicated from a source node to a target node of the edge computing environment, e.g., as illustrate by the "No" logical path of decision 306, monitoring for such a scheduled move and/or replication is ongoingly performed. In contrast, in response to a determination that the data of the predetermined file is scheduled to be moved and/or replicated from a source node to a target node of the edge computing environment, e.g., as illustrated by the "Yes" logical path of decision 306, the determined data compliance ruleset is applied to the data of the predetermined file, e.g., see operation 308. Various techniques for applying the determined data compliance ruleset to the data of the predetermined file is described below, e.g., see FIG. 3B. Application of the determined data compliance ruleset to the data of the predetermined file in response to a determination that the data of the predetermined file is scheduled to be moved and/or replicated from a source node to a target node of an edge computing environment enables a determination to be made whether such movement should in fact not be performed. It should be noted that by determining whether such movement should in fact not be performed, before the movement is performed, ensures that the data compliance ruleset is never violated, and movement events that would otherwise result in such violations are preferably cancelled.

Figure 3B:
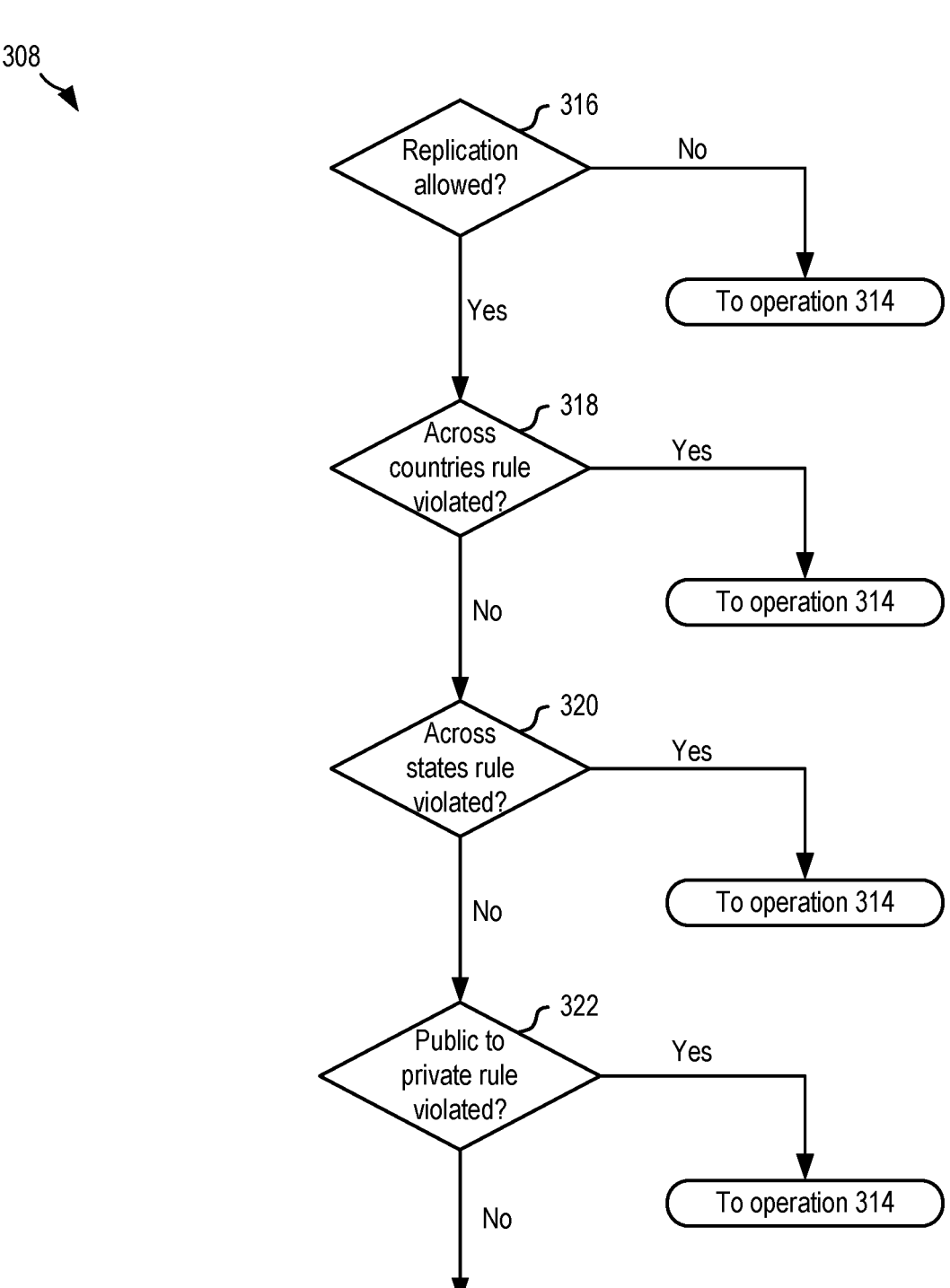
FIG. 3B is a flowchart of sub-operations of an operation of the flowchart of FIG. 3A, in accordance with one aspect of the present invention.

Looking to FIG. 3B, exemplary sub-operations of applying a determined ruleset to data of a predetermined file are illustrated in accordance with one approach, one or more of which may be used to perform operation 308 of FIG. 3A. However, it should be noted that the sub-operations of FIG. 3B are illustrated in accordance with one approach which is in no way intended to limit the invention.

It should be prefaced that the sub-operations of the flowchart of FIG. 3B illustrate a first possible logical flow for applying a determined ruleset to data of a predetermined file. More specifically, in this logical flow, each of the decisions represent a different rule of the determined ruleset that is applied, e.g., six different rules. However, in some other approaches, the determined data compliance ruleset may be different, and thereby may include a different number and/or type of rules.

With continued reference to FIG. 3B, sub-operation 316 includes application of a first rule of a predetermined dataset. Specifically, application of the rule of sub-operation 316 includes determining whether replication of the data of the predetermined file is allowed. In some approaches, such a determination may include checking whether a predetermined bit is set. Such a bit may be selectively set, e.g., based on input received from a device associated with an owner of the data, based on input received from a device associated with an administrator of the edge computing environment, etc., to control whether the data is capable of being moved and/or replicated. In some approaches, in response to a determination that replication of the data of the predetermined file is not allowed, e.g., as illustrated by the "No" logical path of sub-operation 316, the method continues to operation 314. In contrast, in some approaches, in response to a determination that replication of the data of the predetermined file is allowed, e.g., as illustrated by the "Yes" logical path of sub-operation 316, the method optionally continues to sub-operation 318.

Sub-operation 318 includes applying another rule of the determined data compliance ruleset. Specifically, the rule of the determined data compliance ruleset does not allow movement and/or replication of the data across countries. Accordingly, in some approaches, application of the rule includes determining whether a country in which the source node is located is different than a country that the target node is located in. The scheduled movement and/or replication of the data of the predetermined file is, in some approaches, determined to violate the first rule in response to a determination that the source node is located in a first country and the target node is located in a second country that is different than the first country. In response to such a determination, the method optionally continues to operation 314, e.g., as illustrated by the "Yes" logical path of sub-operation 318. In contrast, in some approaches, in response to a determination that the source node is located in a first country and the target node is located in the first country, e.g., as illustrated by the "No" logical path of sub-operation 316, the rule is determined to not be violated and the method optionally continues to sub-operation 320.

Another rule of the determined data compliance ruleset is additionally and/or alternatively applied in sub-operation 320. Specifically, the rule of the determined data compliance ruleset does not allow movement and/or replication of the data across states of a country. Accordingly, in some approaches, application of the rule includes determining whether a state in which the source node is located is different than a state that the target node is located in. The scheduled movement and/or replication of the data of the predetermined file is, in some approaches, determined to violate the rule in response to a determination that the source node is located in a first state and the target node is located in a second state that is different than the first state. In response to such a determination, the method optionally continues to operation 314, e.g., as illustrated by the "Yes" logical path of sub-operation 320. In contrast, in some approaches, in response to a determination that the source node is located in a first state and the target node is also located in the first state, e.g., as illustrated by the "No" logical path of sub-operation 316, the rule is determined to not be violated and the method optionally continues to sub-operation 322.

Another rule of the determined data compliance ruleset is additionally and/or alternatively applied in sub-operation 322. Specifically, the rule of the determined data compliance ruleset does not allow movement and/or replication of the data from a private domain to a public domain. Accordingly, in some approaches, application of the rule includes determining whether a storage protocol of the source node is different than a storage protocol of the target node. More specifically, in some approaches, assuming that the source node currently stores and/or accesses the data using a private domain, a determination may be made as to whether the target node currently stores and/or accesses the data using a public domain. The scheduled movement and/or replication of the data of the predetermined file is, in some approaches, determined to violate the rule in response to a determination that the source node currently stores and/or accesses the data using a private domain and the target node currently stores and/or accesses the data using a public domain. In response to such a determination, the method optionally continues to operation 314, e.g., as illustrated by the "Yes" logical path of sub-operation 322. In contrast, in some approaches, in response to a determination that the target node currently stores and/or accesses the data using a private domain, the scheduled movement and/or replication of the data of the predetermined file may be determined to not be violated, e.g., as illustrated by the "No" logical path of sub-operation 322, and the method optionally continues to sub-operation 324.

Another rule of the determined data compliance ruleset is additionally and/or alternatively applied in sub-operation 324. Specifically, the rule of the determined data compliance ruleset does not allow movement and/or replication of the data across county lines of at least one state. Accordingly, in some approaches, application of the rule includes determining whether a county in which the source node is located is different than a county that the target node is located in. The scheduled movement and/or replication of the data of the predetermined file is, in some approaches, determined to violate the rule in response to a determination that the source node is located in a first county and the target node is located in a second county that is different than the first county. In response to such a determination, the method optionally continues to operation 314, e.g., as illustrated by the "Yes" logical path of sub-operation 324. In contrast, in some approaches, in response to a determination that the source node is located in a first county and the target node is also located in the first county, e.g., as illustrated by the "No" logical path of sub-operation 324, the rule is determined to not be violated and the method optionally continues to sub-operation 326.

In some optional approaches, a rule of the determined data compliance ruleset may be based on a predetermined contractual agreement between at least two organizations associated with the data, e.g., see sub-operation 326. For example, such contractual agreements may define parameters that the rules are based on such as, e.g., where the data can and/or cannot be stored, security requirements of a device that is performing the scheduled data movement and/or replication, processing potential of a device that is performing the scheduled data movement and/or replication, role based access control (RBAC) credentials of a device performing the scheduled data movement and/or replication, predetermined locations where the data may be stored, etc. In some other approaches, the contractual agreements may define parameters that the rules are based on such as, e.g., data not being migrated to a node used by a user with less than a predetermined historical security compliance score, data not being migrated to a node that does not have at least two-stage password credentials, data not being migrated and/or replicated using wireless signals and instead only using hardware connections, etc. In some approaches, the predetermined contractual agreement may additionally and/or alternatively define a rule that the data is not migrated and/or replicated to a node at a location that has predetermined dangerous weather events currently occurring and/or forecasted to occur within a predetermined amount of time. This way, processing associated with the replication and/or movement output operations is not expended for no result where it is relatively likely that the predetermined weather events are predicted to be likely of interrupting or failing the movement and/or replication. In response to a determination that movement and/or replication of the data to the target node would violate contractual obligations of the predetermined contractual agreement, e.g., as illustrated by the "Yes" logical path of sub-operation 326, the method continues to operation 314. In contrast, in response to a determination that movement and/or replication of the data to the target node would not violate contractual obligations of the predetermined contractual agreement, e.g., as illustrated by the "No" logical path of sub-operation 326, the method continues to operation 312. Accordingly, these techniques ensure that a predetermined contractual agreement between at least two organizations associated with the data is met and maintained. This mitigates an amount of computer processing that would otherwise be performed in recovering from a breach of the predetermined contractual agreement.

Referring again to FIG. 3A, method 300 includes determining whether any of the rules of the determined data compliance ruleset are violated, e.g., see operation 310. As illustrated in FIG. 3B, in some approaches, the determined data compliance ruleset includes a plurality of rules. Accordingly, in some approaches, in response to a determination that the scheduled movement and/or replication of the data of the predetermined file does not violate any of the rules of the determined data compliance ruleset, e.g., as illustrated by the "No" logical path of operation 310, the scheduled movement and/or replication of the data of the predetermined file is caused to occur, e.g., see operation 312. The scheduled movement and/or replication of the data of the predetermined file may be caused to occur by, e.g., issuing an authorization instruction to a device that requests the movement and/or replication, setting a bit that performance of the movement and/or replication is based on, instructing a controller of the source node, and/or any other technique for causing a movement and/or replication to be performed that would become apparent to one of ordinary skill in the art after reading the descriptions herein. In contrast, in response to a determination that the scheduled movement and/or replication of the data of the predetermined file violates at least one of the rules of the determined data compliance ruleset, e.g., as illustrated by the "Yes" logical path of operation 310, the scheduled movement and/or replication of the data of the predetermined file is prevented from occurring, e.g., see operation 314. The scheduled movement and/or replication of the data of the predetermined file may be prevented from occurring by, e.g., issuing a denial to a device that requests the movement and/or replication, unsetting a bit that performance of the movement and/or replication is based on, instructing a controller of the source node, and/or any other technique for causing a movement and/or replication to be performed that would become apparent to one of ordinary skill in the art after reading the descriptions herein.

Preventing the scheduled movement and/or replication of the data from occurring in response to a determination that such a scheduled movement and/or replication would otherwise violate one or more rules of the determined data compliance rule enables several performance benefits in the edge computing environment. For example, it may be noted that the conventional techniques described elsewhere above would otherwise allow similar scheduled movement and/or replications to occur despite the scheduled movement and/or replications violating one or more laws and/or regulations. Accordingly, these conventional techniques waste processing resources in performing these movement and/or replication operations because the data moved and/or replicated to the target device is removed from the target device upon discovering the error. In sharp contrast, using the techniques of the novel approaches described herein, movement and/or replication operations that violate rules of a determined data compliance ruleset are prevented from being performed. In doing so, processing potential that would otherwise be unnecessarily expended is preserved. Furthermore, by causing the scheduled movement and/or replication of the data of the predetermined file to occur in response to a determination that such a scheduled movement and/or replication does not violate one or more rules of the determined data compliance ruleset, operations of the edge computing environment are ensured to comply with governing and/or contractual rules. Relatively often, data compliance rules are based on measures that protect data, e.g., maintaining data on private versus public storage. Accordingly, the techniques described herein protect user data from being subjected to damaging and/or malicious actors, e.g., such as unauthorized devices attempting to access the data, devices attempting to intercept the data, etc. This further improves performance of the edge computing environment by avoiding events that would otherwise consume processing potential in recovering from.

In some approaches, the techniques described above in method 300 may be implemented as an algorithm that is used to prevent data from being replicated in a manner that would violate regulatory compliance. The algorithm is preferably executed for each file in a list of files to be replicated in a replication policy. In one illustrative use case and by way of example, a file classified as containing FCC data may be part of a replication policy to copy data from an edge site in the city of Atlanta to an edge site in the city of Tampa. A data catalog may be queried to determine the data classification for the file. In this case the query result is that the data is classified as FCC data. Thereafter, in some approaches, the data catalog is queried to determine replication compliance restriction(s) for FCC regulated data, e.g., a ruleset of data compliance rules that apply to FCC regulated data. In this case, the query may reveal that FCC regulated data cannot cross state boundaries. It may be noted that, additional replication compliance restriction information may be returned by the query, e.g., a rule that defines whether the data can be replicated at all, a rule that defines whether the data can be replicated between country lines, a rule that defines whether the data can be replicated across state and/or province boundaries, a rule that defines whether the data can be replicated to public clouds, a rule that defines whether or not data can be replicated between different counties, etc. Depending on the approach, additional replication rules may also be defined according to different data regulations.

In another use case of the techniques described above in method 300, the module may be affixed to a transmission line, e.g., with permission to do so and monitor the transmissions passed along the transmission line. In one example, the transmission line may be a 5G transmission line. The module may there be caused to monitor and audit transmissions of the 5G transmission line to prevent data from being transmitted, e.g., moved and/or replicated from a first node to a second node via the 5G transmission line, in response to a determination that such a transmission violates rules of a ruleset that is determined to apply to the data.

In some approaches, after obtaining the information mentioned above, the algorithm may apply the determined data compliance ruleset to determine whether the FCC regulated data can be replicated. Next, the algorithm may be caused to check whether the data can be replicated across the country, whether the data can be replicated across different states, whether the state (Florida in the current example) replication target matches the source state (Georgia in the current example), etc. In this example, the states do not match, and therefore, in response to such a determination, the replication is rejected and the algorithm ends. In some preferred approaches, the algorithm is repeated for each file in the replication dataset. Results of the checking may be stored persistently for audit purposes, e.g., to a predetermined database, appended to the instances of data, as metadata of the data, at each of the nodes where the data is stored, only at a core of the edge computing environment, etc.

In some approaches, the operations of method 300 may be performed by an AI model that is trained using a predetermined training set of data. For example, in some approaches, various of the operations noted above may be deployed in a trained state of a trained AI model. Training of the AI model, in some approaches, may be performed by applying a predetermined training data set to learn how to classify data of a predetermined file, determine a data compliance ruleset that applies to the data, and/or determine whether to allow data movement and/or replication based on a determination of whether the rules of the ruleset are violated. Initial training may include reward feedback that may, in some approaches, be implemented using a subject matter expert (SME) that generally understands the classifications and/or rulesets that should be generated based on the training data. However, to prevent costs associated with relying on manual actions of a SME, in another approach, reward feedback may be implemented using techniques for training a BERT model, as would become apparent to one skilled in the art after reading the present disclosure. Once a determination is made that the AI model achieves a redeemed threshold of accuracy of performing the operations described herein during this training, a decision that the model is trained and ready to deploy for performing techniques and/or operations of method 300 may be performed. In some further approaches, the AI model may be a neuromyotonic AI model that may improve performance of computer devices in an infrastructure associated with classifying the data and enforcing fata compliance rulesets, because the neuromyotonic AI model may not need an SME and/or iteratively applied training with reward feedback in order to accurately perform operations described herein. Instead, the neuromyotonic AI model is configured to itself make determinations described in operations herein. Weight values may, in some approaches, be used by the AI reasoning model to collect and analyze information and/or feedback potentially received from edges about movements and/or replications of data. Such an AI model ensures that all data in an edge computing environment maintains compliance with governing and/or regulatory measures, where the scale of such analysis and determinations would not otherwise be feasible for a human to perform. This is because humans are not able to efficiently dynamically monitor whether movement and/or or replication operations comply with such measures, and would otherwise incorporate processing delays and errors in the edge computing environment in the process of attempting to do so. Accordingly, management of operations described herein is not able to be achieved by human manual actions.

Figure 4:
FIG. 4 is a system, in accordance with one aspect of the present invention.

FIG. 4 depicts a system 400, in accordance with one approach. As an option, the present system 400 may be implemented in conjunction with features from any other approach listed herein, such as those described with reference to the other FIGS. Of course, however, such system 400 and others presented herein may be used in various applications and/or in permutations which may or may not be specifically described in the illustrative approaches listed herein. Further, the system 400 presented herein may be used in any desired environment.

In one preferred approach, the system 400 includes a plurality of modules for ensuring data compliance in an edge computing environment. For example, a first of the modules includes a content classification module 402. The content classification module 402 is configured to, e.g., instructed to, inspect data of a predetermined file looking for terms that are consistent with one or more regulatory compliance mandates. For example, assuming that a credit card number is found in the data, the data of the predetermined file may be subject to proper data handling according to the PCI-DSS specification. Other examples include, but are not limited to GDPR, HIPPAA, CCPA, and FCC.

The system 400 additionally includes a compliance mapping module 404. The compliance mapping module 404 is configured to define the data placement rules, e.g., data "gravity" rules, for each regulatory compliance mandate. For example, data classified as being FCC data cannot move across state boundaries, while other data classified as HIPPAA data cannot be put in a public cloud.

In some other approaches, the compliance mapping module 404 may define that a classification of data is FCC and that data cannot cross a state boundary. In another approach, the compliance mapping module 404 may define that a classification of data is HIPPAA data and that a data placement rule that data containing personal identifiable information (PII) cannot be moved to a public cloud.

A sovereignty mapping module 406 is additionally included in the system 400 in some approaches. The sovereignty mapping module 406 is configured to register the location of an edge appliance in terms of predetermined location parameters, e.g., county, city, state, country, etc. The system 400 additionally includes a replication policy engine 408. The replication policy engine 408 is preferably configured to define the source and targets for data replication and data movement, and also identifies the source data itself that should be managed. In some approaches, the source data may be based on a custom tag, a directory, bucket, a list of files, or any other means of providing a corpus of data to replicate that would become apparent to one of ordinary skill in the art after reading the descriptions herein.

In some approaches, the replication policy engine includes filtering criteria that defines the data that is to be moved or copied in the heterogeneous storage landscape. The filtering criteria may take any system metadata and/or custom metadata tags. The policy may also define the replication target(s) or destination(s).

In some approaches, the sovereignty mapping module 406 is caused to obtain and store the location of each component in an edge topology. For example, user input may be received and may include, e.g., the city, county, state, and country of a particular edge appliance during installation and configuration. The location of public cloud instances that are part of the topology and any other relevant edge component may also be registered. Additionally, the location may be tagged as "private" or "public" to distinguish between private secure data centers vs public cloud and/or relatively less secure environments.

The system 400 additionally includes a replication compliance module 410 that is configured to ensure that data that is to be replicated does not violate one or more regulatory compliance data gravity restrictions, e.g., rules of a determined data compliance ruleset. In some approaches, the system may additionally and/or alternatively include a data catalog that stores system and custom metadata about all the data in the edge computing environment.

Figure 5:
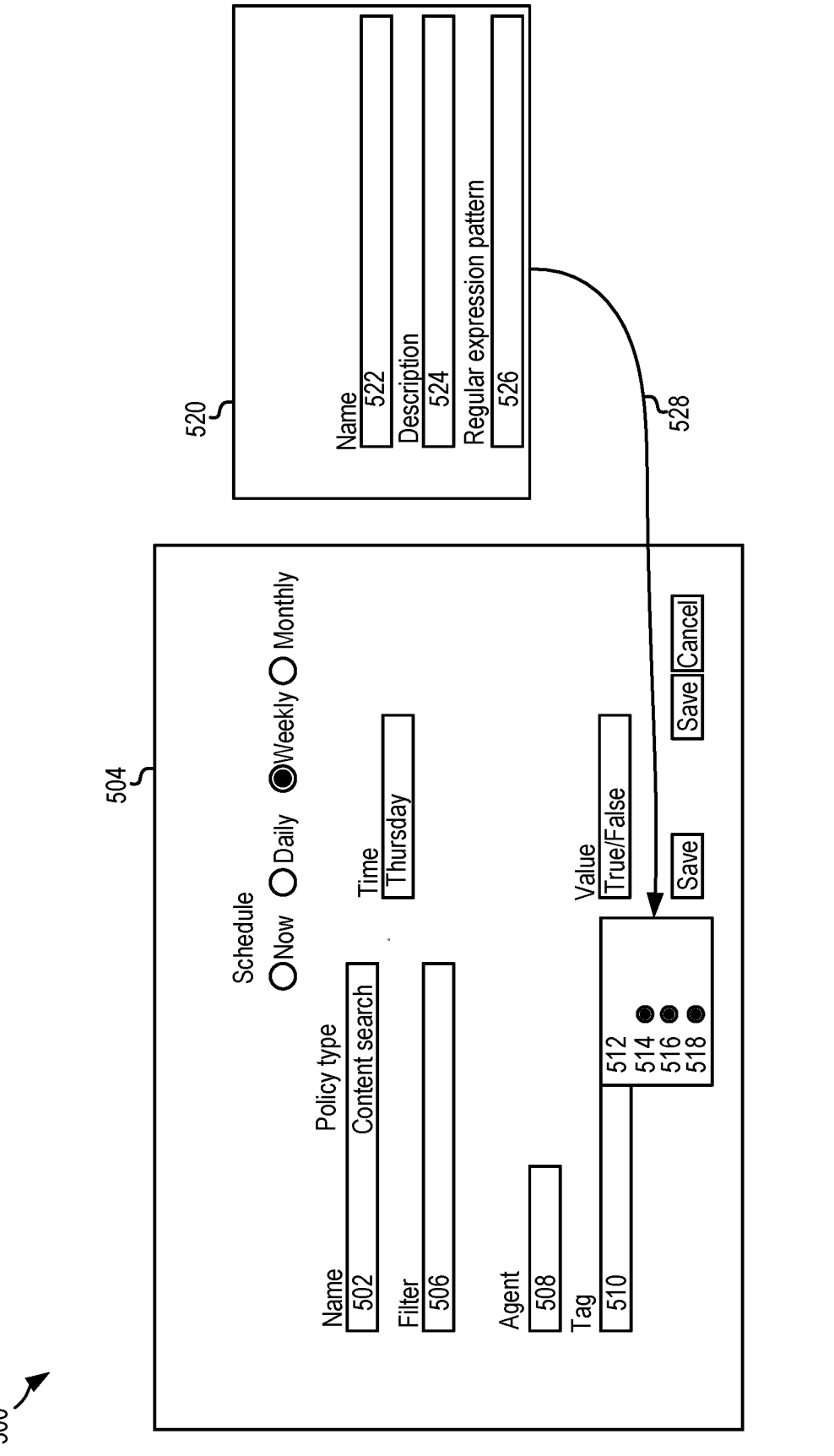
FIG. 5 is an application graphical user interface, in accordance with one aspect of the present invention.

FIG. 5 depicts an application graphical user interface 500, in accordance with one approach. As an option, the present application graphical user interface 500 may be implemented in conjunction with features from any other approach listed herein, such as those described with reference to the other FIGS. Of course, however, such application graphical user interface 500 and others presented herein may be used in various applications and/or in permutations which may or may not be specifically described in the illustrative approaches listed herein. Further, the application graphical user interface 500 presented herein may be used in any desired environment.

The graphical user interface 500 illustrates one approach of the content classification module described herein. A content classification policy, e.g., see policy name 502 and policy type "Content search" in first window 504, may take filtering criteria, e.g., see filter 506 that defines the data that is to be inspected in the heterogeneous storage landscape. The filtering criteria may take any system metadata and/or custom metadata tags, e.g., see agent 508 and tag 510. A policy may also include one or more terms to look for in the source data. For example, a search expression may be defined which specifies search expression variables 512, e.g., Email ID 514, credit card information 516, social security information 518, etc. In some approaches, an add-on regular expression may be created to customize search patterns that are performed, e.g., see second window 520 of the graphical user interface 500. In some approaches, such an add-on regular expression may include a name, e.g., a name 522, a description 524, a regular expression pattern 526, etc., which may be appended to one or more other search expressions, e.g., see operation 528. A schedule that controls when the module runs may also be defined, e.g., see the model is set to run "Weekly" in the current approach.

A value, e.g., true or false, may also be specified so that the data is not shown in the results (to protect user data), but rather just an indication of whether or not such data exists in a considered predetermined file. Techniques such as regular expression pattern matching, natural language processing based on named entity recognition, optical character recognition, speech to text, etc. may be used in a pipeline to extract relevant information from the predetermined file during classification of the data. For example, in some approaches, this information may be stored in an easily searchable manner and may map to one or more classification tags. According to a more specific approach, a policy may inspect all .pdf files in a particular data source for credit card numbers using regular expressions and if they are found, set the classification tag to PCI-DSS for those files.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:
using a determined classification of a predetermined file to determine a data compliance ruleset that applies to data of the predetermined file;
monitoring an input/output (I/O) queue of a processing circuit of an edge computing environment to determine whether the data of the predetermined file is scheduled to be moved and/or replicated;
in response to a determination that the data of the predetermined file is scheduled to be moved and/or replicated from a source node to a target node of the edge computing environment, applying the determined data compliance ruleset to the data of the predetermined file;
in response to a determination that the scheduled movement and/or replication of the data of the predetermined file violates at least one rule of the determined data compliance ruleset, instructing a controller of the source node to prevent the scheduled movement and/or replication of the data of the predetermined file from occurring; and
causing the data of the predetermined file to be classified according to predetermined classes of data, wherein natural language processing operations are performed for classifying the data of the predetermined file.

2. The computer-implemented method of claim 1, wherein the determined data compliance ruleset includes a plurality of rules, and comprising: in response to a determination that the scheduled movement and/or replication of the data of the predetermined file does not violate any of the rules of the determined data compliance ruleset, causing the scheduled movement and/or replication of the data of the predetermined file to occur.

3. The computer-implemented method of claim 2, wherein the causing the scheduled movement and/or replication of the data of the predetermined file to occur comprises the data of the predetermined file not being migrated and/or replicated using wireless signals and instead being migrated and/or replicated using only using hardwire connections, wherein the causing the scheduled movement and/or replication of the data of the predetermined file to occur comprises instructing the controller of the source node.

4. The computer-implemented method of claim 3, wherein a module within the edge computing environment is affixed to a 5G transmission line that includes the hardware connections, wherein the module is used to selectively prevent the causing the scheduled movement and/or replication of the data of the predetermined file to occur via the hardwire connections.

5. The computer-implemented method of claim 1, further comprising:

in response to the determination that the scheduled movement and/or replication of the data of the predetermined file violates at least one rule of the determined data compliance ruleset, setting a predetermined bit associated with the predetermined file to a first value;
in response to a determination that the scheduled movement and/or replication of the data of the predetermined file does not violate at least one rule of the determined data compliance ruleset, setting the predetermined bit associated with the predetermined file to a second value; and
using the predetermined bit to control whether the data is moved and/or replicated within the edge computing environment.

6. The computer-implemented method of claim 1, wherein the classes of data are selected from the group consisting of: Federal Communications Commission (FCC) data, financial data, health data, data subject to predetermined consumer privacy acts, and data subject to predetermined data protection regulations, wherein the natural language processing operations are performed by an artificial intelligence (AI) model that is trained using a training set of data, and comprising: providing feedback to the AI model to increasing an accuracy of the AI model performing the natural language processing operations.

7. The computer-implemented method of claim 1, wherein a first rule of the determined data compliance ruleset does not allow movement and/or replication of the data across countries, wherein the scheduled movement and/or replication of the data of the predetermined file is determined to violate the first rule in response to a determination that the source node is located in a first country and the target node is located in a second country that is different than the first country.

8. The computer-implemented method of claim 1, wherein a first rule of the determined data compliance ruleset does not allow movement and/or replication of the data across states, wherein the scheduled movement and/or replication of the data of the predetermined file is determined to violate the first rule in response to a determination that the source node is located in a first state and the target node is located in a second state that is different than the first state.

9. The computer-implemented method of claim 1, wherein a first rule of the determined data compliance ruleset does not allow movement and/or replication of the data across county lines of a state, wherein the scheduled movement and/or replication of the data of the predetermined file is determined to violate the first rule in response to a determination that the source node is located in a first county and the target node is located in a second county that is different than the first county.

10. The computer-implemented method of claim 1, wherein a first rule of the determined data compliance ruleset is based on a predetermined contractual agreement between at least two organizations associated with the data, wherein the first rule does not allow movement and/or replication of the data to a node at a location that has predetermined dangerous weather events currently occurring and/or forecasted to occur within a predetermined amount of time, wherein the scheduled movement and/or replication of the data of the predetermined file is determined to violate the first rule in response to a determination that the target node is at a location that has at least one of the predetermined dangerous weather events currently occurring and/or forecasted to occur within the predetermined amount of time.

11. A computer program product, the computer program product comprising a computer readable storage medium having program instructions embodied therewith, the program instructions readable and/or executable by a computer to cause the computer to:

use a determined classification of a predetermined file to determine a data compliance ruleset that applies to data of the predetermined file;

monitor an input/output (I/O) queue of a processing circuit of an edge computing environment to determine whether the data of the predetermined file is scheduled to be moved and/or replicated;

in response to a determination that the data of the predetermined file is scheduled to be moved and/or replicated from a source node to a target node of the edge computing environment, apply the determined data compliance ruleset to the data of the predetermined file;

in response to a determination that the scheduled movement and/or replication of the data of the predetermined file violates at least one rule of the determined data compliance ruleset, instruct a controller of the source node to prevent the scheduled movement and/or replication of the data of the predetermined file from occurring; and cause the data of the predetermined file to be classified according to predetermined classes of data, wherein natural language processing operations are performed for classifying the data of the predetermined file.

12. The computer program product of claim 11, wherein the determined data compliance ruleset includes a plurality of rules, and the program instructions readable and/or executable by the computer to cause the computer to: in response to a determination that the scheduled movement and/or replication of the data of the predetermined file does not violate any of the rules of the determined data compliance ruleset, cause the scheduled movement and/or replication of the data of the predetermined file to occur.

13. The computer program product of claim 11, wherein the classes of data are selected from the group consisting of: Federal Communications Commission (FCC) data, financial data, health data, data subject to predetermined consumer privacy acts, and data subject to predetermined data protection regulations, wherein the natural language processing operations are performed by an artificial intelligence (AI) model that is trained using a training set of data, wherein the program instructions are readable and/or executable by the computer to cause the computer to: provide feedback to the AI model to increasing an accuracy of the AI model performing the natural language processing operations.

14. The computer program product of claim 11, wherein the target node is a core node of the edge computing environment.

15. The computer program product of claim 11, wherein a first rule of the determined data compliance ruleset does not allow movement and/or replication of the data across countries, wherein the scheduled movement and/or replication of the data of the predetermined file is determined to violate the first rule in response to a determination that the source node is located in a first country and the target node is located in a second country that is different than the first country.

16. The computer program product of claim 11, wherein a first rule of the determined data compliance ruleset does not allow movement and/or replication of the data across states, wherein the scheduled movement and/or replication of the data of the predetermined file is determined to violate the first rule in response to a determination that the source node is located in a first state and the target node is located in a second state that is different than the first state.

17. The computer program product of claim 11, wherein a first rule of the determined data compliance ruleset does not allow movement and/or replication of the data across county lines of a state, wherein the scheduled movement and/or replication of the data of the predetermined file is determined to violate the first rule in response to a determination that the source node is located in a first county and the target node is located in a second county that is different than the first county.

18. The computer program product of claim 11, wherein a first rule of the determined data compliance ruleset is based on a predetermined contractual agreement between at least two organizations associated with the data, wherein the first rule does not allow movement and/or replication of the data to a node at a location that has predetermined dangerous weather events currently occurring and/or forecasted to occur within a predetermined amount of time, wherein the scheduled movement and/or replication of the data of the predetermined file is determined to violate the first rule in response to a determination that the target node is at a location that has at least one of the predetermined dangerous weather events currently occurring and/or forecasted to occur within the predetermined amount of time.

19. A system, comprising:
a processor; and
logic integrated with the processor, executable by the processor, or integrated with and executable by the processor, the logic being configured to:
cause data of a predetermined file to be classified according to predetermined classes of data, wherein natural language processing operations are performed for classifying the data of the predetermined file;
use a determined classification of the predetermined file to determine a data compliance ruleset that applies to the data of the predetermined file;
monitor an input/output (I/O) queue of a processing circuit of an edge computing environment to determine whether the data of the predetermined file is scheduled to be moved and/or replicated;
in response to a determination that the data of the predetermined file is scheduled to be moved and/or replicated from a source node to a target node of the edge computing environment, apply the determined data compliance ruleset to the data of the predetermined file; and
in response to a determination that the scheduled movement and/or replication of the data of the predetermined file violates at least one rule of the determined data compliance ruleset, instruct a controller of the source node to prevent the scheduled movement and/or replication of the data of the predetermined file from occurring.

20. The system of claim 19, wherein the determined data compliance ruleset includes a plurality of rules, and the logic being configured to: in response to a determination that the scheduled movement and/or replication of the data of the predetermined file does not violate any of the rules of the determined data compliance ruleset, cause the scheduled movement and/or replication of the data of the predetermined file to occur.

* * * * *